(12) United States Patent
Gosalia (10) Patent No.: US 10,318,850 B1
(45) Date of Patent: Jun. 11, 2019

(54) SMART CARD HOLDER

(71) Applicant: PAYPAL, INC., San Jose, CA (US)

(72) Inventor: Jigar Rajnikant Gosalia, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/050,444

(22) Filed: Jul. 31, 2018

(51) Int. Cl.
*A45C 1/06* (2006.01)
*G06K 13/08* (2006.01)

(52) U.S. Cl.
CPC .............. *G06K 13/085* (2013.01); *A45C 1/06* (2013.01); *A45C 2001/065* (2013.01)

(58) Field of Classification Search
None
See application file for complete search history.

(56) References Cited

U.S. PATENT DOCUMENTS

2017/0161709 A1\* 6/2017 Tunnell ................ G06Q 20/206

\* cited by examiner

*Primary Examiner* — Kristy A Haupt
(74) *Attorney, Agent, or Firm* — Haynes and Boone, LLP (57) ABSTRACT

A system includes: a physical wallet configured to attach to a first mobile communication device and to physically store a first funding card and additional funding cards in a holding compartment; a non-transitory memory; and one or more hardware processors coupled to the non-transitory memory and configured to read instructions from the non-transitory memory to cause the system to perform operations comprising: associating a plurality of funding cards with the first mobile communication device, wherein the first funding card is not a member of the plurality of funding cards associated with the first mobile communication device; and detecting when the first funding card is physically removed from the holding compartment of the system; and transmitting a notification to a computer in response to the first funding card being physically removed from the holding compartment.

21 Claims, 8 Drawing Sheets

SMART CARD HOLDER

BACKGROUND

Field of the Invention

The present disclosure generally relates to physical wallets operable to detect cards stored therein and to perform actions in response thereto.

Related Art

Consumers are becoming more and more reliant upon funding cards, such as credit cards or debit cards, to make payments to brick-and-mortar stores, online marketplaces, charities, and the like. But carrying funding cards out in public, or even storing cards in one's own home, may come with the risk of misplacing a card, or otherwise having a card become lost or stolen.

While it is typical that a card issuer would not hold a consumer responsible for fraudulent charges on her funding card, the consumer still may experience inconvenience. For instance, when a card becomes lost or stolen, that consumer may have the card replaced and then be in the position of updating payment information for a variety of different online marketplaces. Furthermore, from the card issuer's or merchant's point of view, lost and stolen cards may very well lead to monetary losses in some cases.

It would be desirable to have a technological solution that may intervene in the case of a lost or stolen card. It would also be desirable to have a technological solution that may provide for something short of card replacement in the case when a card may be out of an authorized user's control but fraud is not imminent or expected.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various embodiments provide for a smart card holder that includes a physical wallet configured to attach to a mobile communication device and to physically store multiple funding cards in a holding compartment. In this example, the physical wallet may include a power source, a transceiver, a memory, and a processor, wherein the processor executes code stored in the memory to provide enhanced functionality to the physical wallet. For instance, the physical wallet may associate the funding cards with a mobile communication device. The physical wallet may also detect when a given card is inserted into the holding compartment or removed from the holding compartment by use of a built-in card reader, such as a magnetic stripe reader, a chip card reader, a camera, or the like. The physical wallet reads the card to determine the card number, expiration date, the name of the authorized user, and/or other appropriate information.

Continuing with the example, the card holder may communicate electronically with the mobile communication device using, e.g., Bluetooth or other appropriate wired or wireless protocols. Thus, when the card holder is physically attached to the mobile communication device, the card holder and the mobile communication device may communicate to inform the mobile communication device that the card holder is physically attached thereto and to confirm to the card holder that it is physically attached to the mobile communication device.

This particular example assumes that the mobile communication device belongs to one person, and also that the person has performed a set up routine to associate the card holder with the mobile communication device and to associate the person's funding cards with the card holder and the mobile communication device. Thus, the card holder associates the various funding cards with the mobile communication device and, by extension, the owner of the mobile communication device.

The person may use an application on the mobile communication device to communicate with the card holder to perform the set up routine and also to send and receive messages, as explained in more detail below. Furthermore, the card holder may be capable of communicating with other devices on its own (e.g., by Bluetooth or other appropriate wireless protocol) and may also use communication capabilities of the mobile communication device via the application to communicate with other devices or networks, as explained in more detail below.

In an example in which a first funding card not associated with the mobile communication device is mistakenly inserted into the card holder, the card holder detects this discrepancy. For instance, when the card is inserted, the card holder reads the card and compares the card's information to a database of stored card information for associated cards. In an instance in which the information of the card does not match a known, associated card, that is an indication that the particular card may be misplaced or inserted into the card holder by mistake. Later, if the person attempts to use the card in a transaction, the card holder may transmit a notification to another computer in response to detecting that the card has been physically removed from the holding compartment. For instance, the card holder may transmit a broadcast query to any nearby point-of-sale systems to determine whether the card is being used in a transaction. If a point-of-sale system replies that the card is being used in a transaction, then the card holder may prevent the transaction by transmitting a message to the point-of-sale system indicating that the transaction should be declined. Such message may also be transmitted to a server of a merchant acquirer or an issuing entity (e.g., via the point-of-sale system) to cause a transaction to be declined.

Further continuing with the example, the card holder may transmit a message to a central server that has a database of authorized users of different cards, where the message indicates that the particular card may be being used by an unauthorized user. The central server may be associated with a card issuer or be independent of the card issuer. The central server may query its database to determine the authorized user and to transmit a message to an application on a mobile communication device of the authorized user. The application of the authorized user may then allow the authorized user to decline the transaction, lock the card, or allow the transaction.

Various embodiments may also include detecting that a card that is associated with the card holder is not inserted into the card holder. For instance, a card holder may associate four different funding cards with a particular mobile communication device. The card holder may detect three cards currently inserted therein, determine that the fourth card is not currently inserted therein, and cause the application on the mobile communication device to display a message to the user indicating that the fourth card is missing. The application may allow the user a choice to lock the card and may also notify an issuing entity that the card is missing.

Various embodiments allow for a given card holder to be associated with a multitude of different mobile devices as well. Thus, a given card holder may be associated with a multitude of different cards and a multitude of different mobile devices, creating a M:1:N relationship. Different individuals may share a same card holder, attaching and un-attaching the card holder from their respective mobile devices as desired.

In another example, the card holder and the mobile device may cooperate to detect when the card holder and the mobile communication device are in possession of an unauthorized user. For instance, the mobile device and/or the card holder may include face recognition, fingerprint recognition, other biometric recognition, password recognition, or other techniques to determine whether a user in possession of the mobile device or the card holder is an authorized user. In an instance in which the mobile device detects that the card holder and the mobile device are in possession of the unauthorized user, the card holder or the mobile communication device may prevent a transaction from using a funding card that is stored in the card holder. Specifically, the card holder or the mobile device may alert a point-of-sale system, a merchant acquirer, a card issuer, or other entity to decline the transaction.

The card holder or mobile phone may also send a message to the authorized user on an alternate device to allow the authorized user to decline the transaction or to report the card as lost or stolen.

Figure 1:
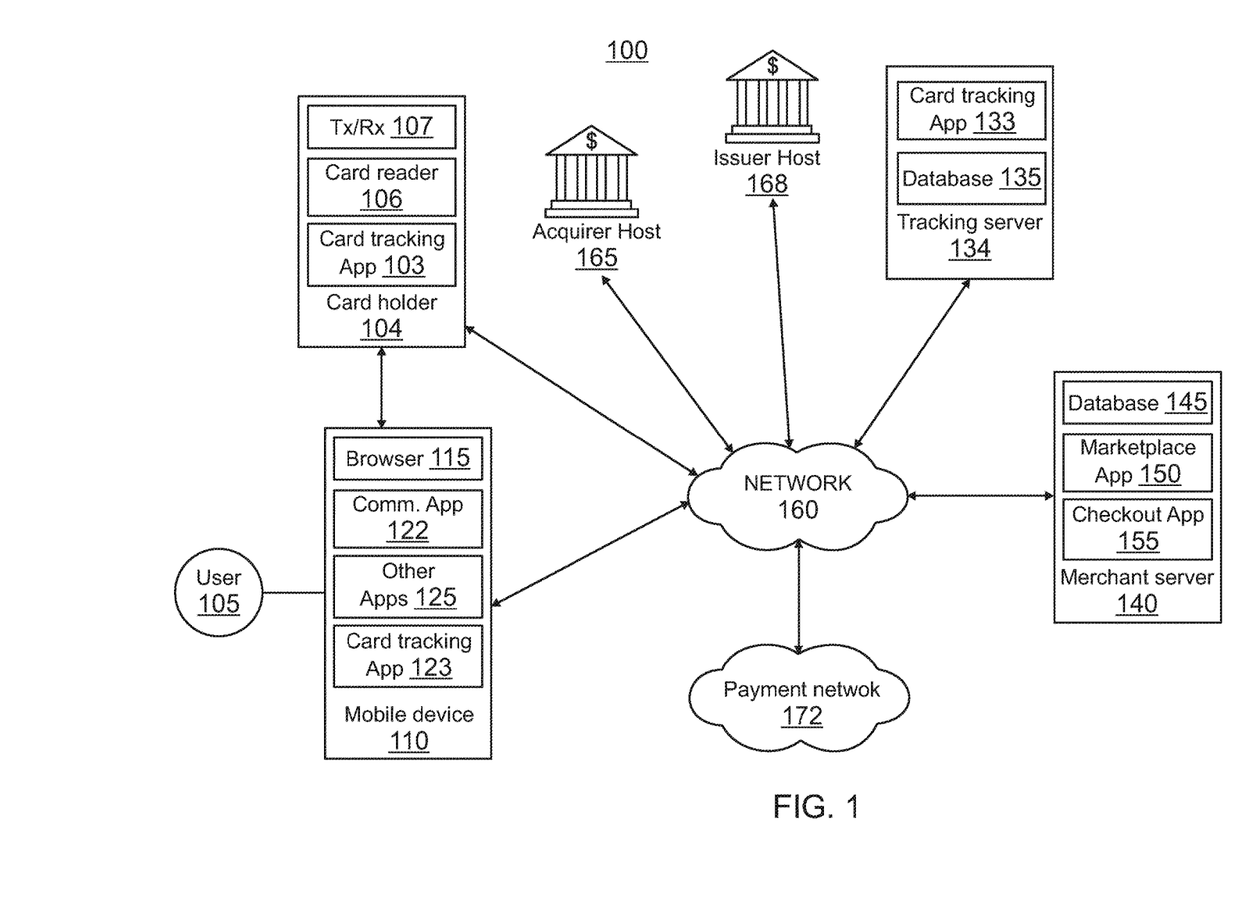
FIG. 1 is block diagram of a networked system suitable for implementing a smart card holder according to an embodiment.

FIG. 1 is a block diagram of a networked system suitable for implementing a smart card holder according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a card holder 104, a user device 110, a merchant server 140, an acquirer host 165, an issuer host 168, and a payment network 172 in communication over a network 160.

Card holder 104, user device 110, merchant server 140, acquirer host 165, issuer host 168, and payment network 172 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

Figure 3A:
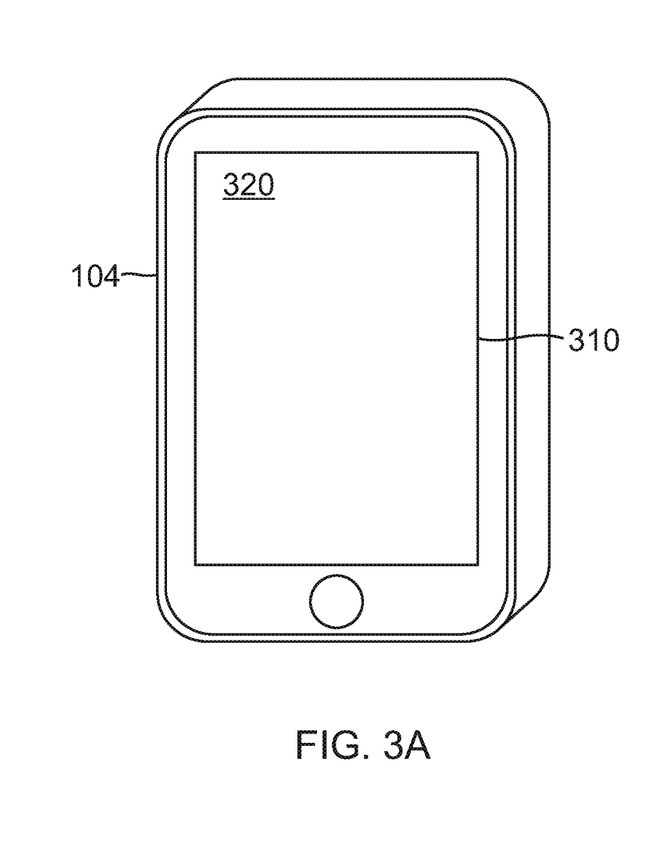
FIGS. 3A and 3B are illustrations of an example card holder attached to a mobile communication device and to physically holding a plurality of funding cards according to one embodiment.
Figure 3B:
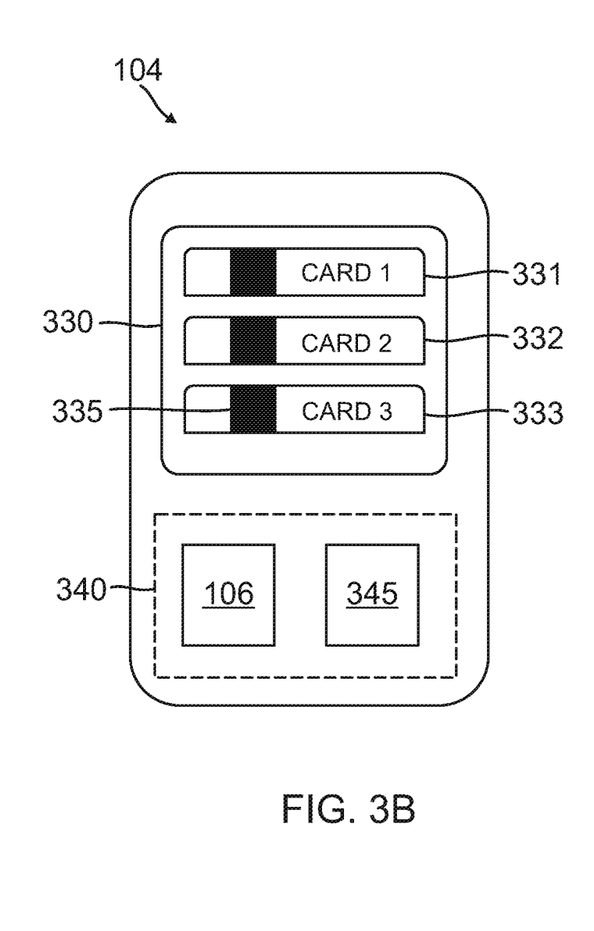

Card holder 104 may be implemented as a physical wallet configured to receive multiple funding cards. An example implementation of card holder 104 is provided at FIGS. 3A and 3B, showing an integrated card reading device, memory, processor, communication device, and power device. Card holder 104 includes a card tracking application 103, which is configured to detect when cards are inserted or removed, read information from those cards, store associations between known cards and one or more mobile communication devices, and track known and unknown cards as they are inserted, removed, or used in various transactions.

Card holder 104 also includes card reader 106, which may include any device operable to acquire information from a funding card. Examples of devices that may be included in card reader 106 include a magnetic stripe reader, a chip card reader, a camera, and the like. Card tracking application 103 may communicate with card reader 106 to detect when a card is inserted or removed and to read information from the card. Examples of information that may be read from the card include a name of an authorized user, an account number, an expiration date, an issuing bank identifier, and the like. For instance, when card reader 106 detects that a card is inserted into the card holder 104, it may read information from the card and pass that information to the card tracking application 103.

Card holder 104 also includes transceiver 107. Card holder 104 employees transceiver 107 to communicate with mobile device 110, with network 160, with a point-of-sale system (not shown) or other computer device. In some examples, card holder 104 may use transceiver 107 to establish a wired or wireless communication session with mobile device 110. An example may include a near field communication (NFC) session, a Bluetooth session, or other session that allows information to be exchanged between mobile device 110 and card holder 104. Examples of communication between card holder 104 and other computer systems as described in more detail below.

Tracking server 134 is a server that may be associated with the issuer host 168, the payment service provider 170, or a third-party unrelated to those entities. In this example, tracking server includes database 135, which includes a plurality of entries to indicate relationships between funding cards, users, card holders (e.g., card holder 104), issuing entities, and mobile devices. Card tracking application 133 is configured to query database 135 to determine how to contact an authorized user or issuer of a card when receiving a request from card tracking application 103 or a point-ofsale system. For instance, if it appears that a card may be being used by an unauthorized user, a point-of-sale system, a card holder, a mobile device associated with the card holder, or other entity may transmit a message to card tracking application 133, and card tracking application 133 may use database 135 to determine which issuer or which authorized user should be contacted and at which network address.

User device 110 may be implemented using any appropriate hardware and software configured for wired and/or wireless communication over network 160. For example, in one embodiment, the user device may be implemented as a personal computer (PC), a smart watch, a smart phone, a smart phone with additional hardware such as NFC chips, BLE hardware etc, wearable devices with similar hardware configurations such as a gaming device, a virtual reality headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services.

User device 110 also may include other applications to perform functions, such as email, texting, voice and IM applications that allow user 105 to send and receive emails, calls, and texts through network 160, as well as applications that enable the user to communicate, transfer information, and make payments.

A communications application 122, with associated interfaces, enables user device 110 to communicate within system 100. For instance, user device 110 may execute a payment by communicating with a merchant point-of-sale system associated with merchant server 140 over network 160.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 by passing a payment request to acquirer host 165 (and on to issuer host 168 and payment network 172) over network 160. Checkout application 155 may be configured to receive payment via a plurality of payment methods including cash, credit cards, debit cards, checks, money orders, or the like.

Payment network 172 may be operated by payment card service providers or card associations, such as DISCOVER, VISA, MASTERCARD, AMERICAN EXPRESS, RuPAY, China Union Pay, etc. The payment card service providers may provide services, standards, rules, and/or policies for issuing various payment cards. A network of communication devices, servers, and the like also may be established to relay payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Figure 2:
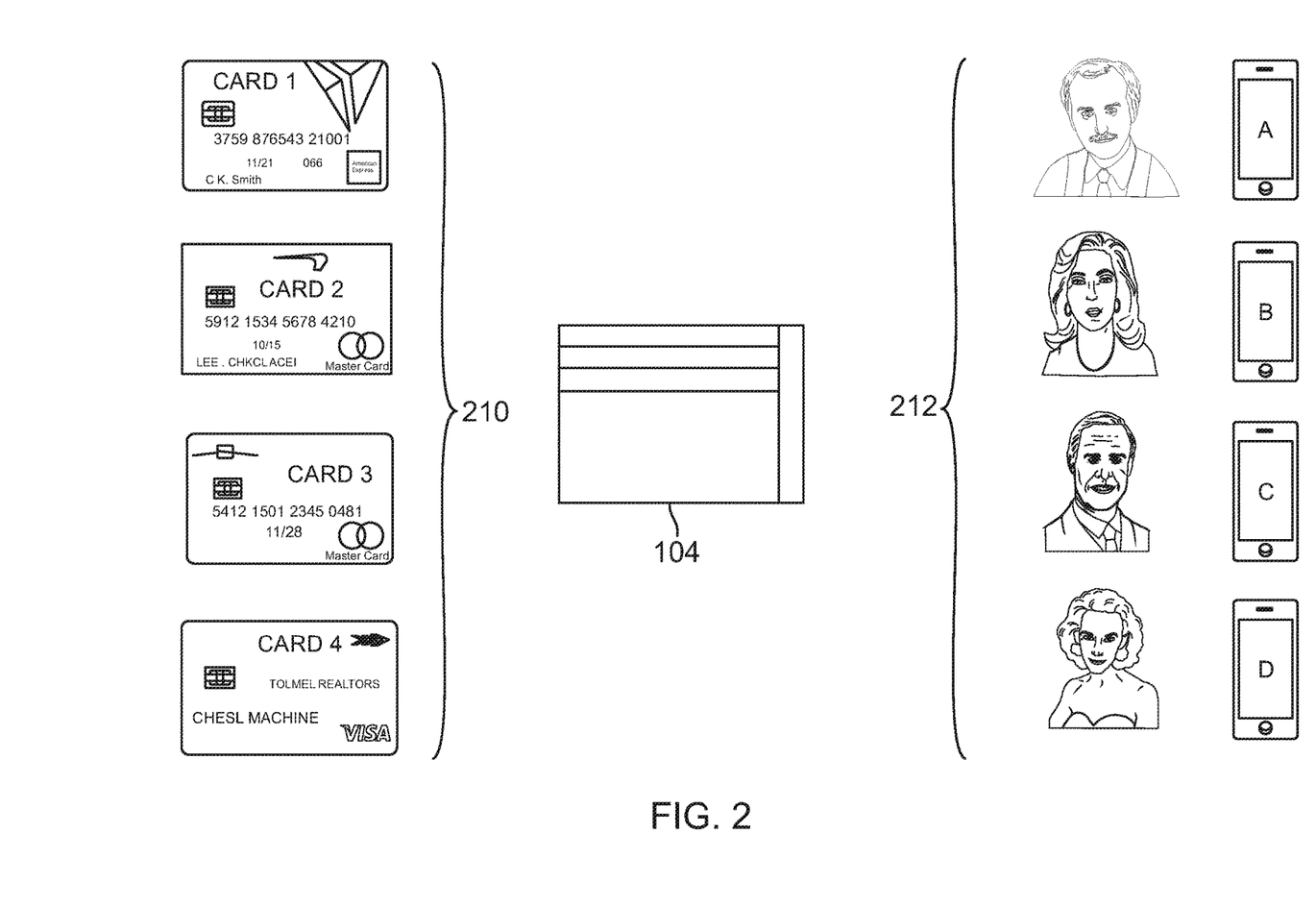
FIG. 2 is an illustration of a relationship between funding cards, a card holder, and mobile communication devices according to one embodiment.

FIG. 2 is an illustration of a relationship between the card holder 104, mobile devices 212, users, and funding cards 210 according to one embodiment. In the example of FIG. 2, card holder 104 may be associated with a plurality of different mobile communication devices 212. It is usually the case that a given mobile communication device will be owned by a single user, and thus a relationship between card holder 104 and one of the respective mobile devices 212 also defines a relationship between the card holder 104 and the user associated with the respective mobile communication device.

For each one of the mobile communication devices 212, there exists a set of funding cards that are associated with that particular mobile communication device. Thus, mobile device A may be associated with a first set of cards, mobile device B may be associated with a second set of cards that may or may not overlap with the first set of cards. The same is true for the other mobile communication devices 212. The associations between sets of cards 210 and mobile devices 212 may be stored in memory at card holder 104. When card holder 104 detects that it is attached to a particular mobile device, card holder 104 may use an identifier (ID) of the mobile communication device to search entries in its memory to determine which set of cards are associated with that particular mobile device. Accordingly, the cards, card holder 104, and the mobile devices may have a M:1:N relationship, with M and N being any appropriate integer for cards and mobile devices (respectively). Or put another way, card holder 104 may serve a variety of different users, each of the users having one or more mobile devices and one or more sets of cards. However, in some embodiments, the card holder 104 may be owned by single person and used with only a single mobile device so that the relationship is M:1:1.

FIGS. 3A and 3B illustrate an example implementation of the card holder, according to one embodiment. In this example, card holder 104 can be seen taking a form factor of a smart phone case, surrounding the sides of a smart phone 310 while exposing the display screen 320 to be seen and touched. FIG. 3A is an illustration from the perspective of the front side of smartphone 310, whereas FIG. 3B is an illustration from the perspective of the back side of smart phone 310.

Card holder 104 includes holding compartment 330, which has slots or pockets into which the funding cards 331-333 may be inserted. While holding compartment 330 is shown to accommodate three funding cards in three separate slots in FIG. 3B, the scope of embodiments may include holding compartment 330 being configured to hold any appropriate number of cards in any number of slots, whether more than three or less than three. A slot may support multiple cards where the card reader is such that it can detect and distinguish multiple cards inserted into or removed from the slot associated with the card reader.

Card holder 104 may be constructed of any appropriate material. Examples may include leather, plastic, rubber, carbon fiber composite, elastic, fabric and the like. Furthermore, card holder 104 may physically attach to a mobile device such as smart phone 310 using any appropriate technique. For instance, in FIGS. 3A and 3B card holder 104 is shown surrounding the sides of smart phone 310 to create a snug friction fit. However, other embodiments may cover less surface area and may use a clip, or a magnet, or other technique to physically attach to the mobile device.

Card holder 104 includes electronic components 340 integrated therein. Electronic components 340 include card reader 106 and chipset 345. Card reader 106 may include any appropriate card reader, such as a magnetic stripe reader, a chip card reader, a camera, or the like. Thus in one example, when a user inserts a funding card into a slot of holding compartment 330, the motion causes a magnetic stripe (e.g., stripe 335 of card 333) to slide through a magnetic card reader, which reads information from a magnetic stripe and passes that information to a processor at chipset 345. The processor at chipset 345 may then store information at its memory chip to indicate the particular card and the particular slot. Similarly, at a later time when the user removes the funding card from that slot, the motion causes the magnetic stripe to slide against the reader, which indicates that the card is being withdrawn from the slot. The magnetic card reader then sends information to the processor chipset 345 to indicate that the card has been removed, and the processor may then store information at its memory to indicate that the particular card at the particular slot has been removed. A chip card reader may work in a similar way, detecting when a chip card is inserted or removed and passing that information to the processor at chipset 345. Using a camera as a card reader may operate differently, such as including an integrated light inside each of the slots to facilitate reading letters and numbers on a card. The scope of embodiments is not limited to any particular card reader.

The chipset 345 may also include the transceiver 107, as described above at FIG. 1. The transceiver 107 may communicate with the mobile device, such as smart phone 310, using any appropriate wired or wireless protocol.

Although not shown here, electronic components 340 may further include a power pack, such as a battery and equipment to charge the battery. In some examples, the battery and its charging equipment may include solar charging ability, thermal charging ability, or wireless charging from a battery of the mobile device. The power pack may power card reader 106 and chipset 345 and any other electronic components, according to the particular design of the card holder 104.

As described above, card holder 104 may associate one or more funding cards (e.g., funding cards 331-333) with a mobile device (e.g., smartphone 310). The scope of embodiments further includes a registration process to associate cards with the card holder 104 and a mobile device. The registration process may be performed as part of a setup process when the card holder 104 is first used or may be performed any time a new card is added to the set of cards that are associated with card holder 104 and the mobile device.

In one example registration process, the card holder is attached to the mobile device, and the card holder and the mobile device have an established relationship. A user inserts a new card into a slot of holding compartment 330. The card holder 104 then uses card reader 106 to detect insertion of that funding card into the holding compartment. The card reader reads information from the card and passes it to the processor, which uses the information that was read from the card to check data stored in its memory to determine that the funding card is not one of the cards that is currently associated with the particular mobile communication device, if any. The card holder 104 then transmits a message using a wired or wireless protocol to an application (e.g., card tracking application 123) running on the mobile device. The message requests to associate the card with the mobile communication device. This action may further include displaying a request to associate the card with the mobile communication device on a user interface of the application and displayed upon the mobile communication device itself. For instance, the user interface of the application may display a button for Yes and a button for No and allow a user to select an option. In response to an affirmative reply to the request from the application to the card holder 104, the card holder 104 stores in its memory an association between the particular funding card and the mobile communication device.

The registration process may further include transmitting another message to a network server (e.g., tracking server 134 of FIG. 1) including information indicating the association. Such information may include the credit card number, an identification of the phone, an identification of the user, an identification of the card holder, or other appropriate information. The card holder 104 may transmit the message to the network server in any appropriate manner, such as by utilizing the mobile data or wireless Internet capability of the mobile device via the application. The network server stores the information in a database 135 with information for other card holders and smart phones. As described further below, the network server may be used as an intermediary to alert an authorized user of a potential unauthorized use of a card.

When the card holder 104 registers a new card, it may also send a message to the issuing bank (e.g., at issuer host 168) to alert the issuing bank as well. This may allow the issuing bank to keep track of various cards that are associated with a particular mobile device and also allows the issuing bank to be involved in allowing or disallowing a particular transaction, as explained in more detail with respect to FIGS. 4-7. It may also allow the issuing bank to communicate directly with the card holder 104.

With a card holder 104 having registered funding cards, the card holder 104 may provide features and advantages in multiple different use cases. In one example use case, card holder 104 is attached to a mobile device and stores several cards that are registered to the mobile device, as described above. However, the card holder 104 also stores a card that is not registered to the mobile device. When the user tries to use the unregistered card, the card holder 104 transmits a notification to the rightful owner of the card. For instance, card holder 104 may detect that the unregistered card was removed from the holding compartment 330. In response, the card holder 104 may transmit a message to a central server (e.g., tracking server 134) over a network (e.g., network 160) either to alert the server of the potentially fraudulent use or to find out who the rightful owner is. At this point, the card holder 104 may know the identification of the card but may not know the real card holder's identity. Thus, the central server may have a database (e.g., database 135) of cards, owners, and mobile devices so that the central server can identify the true owner. Then, either the server or card holder 104 may transmit a message to a device known to belong to the true owner alerting the true owner of the attempted use. An application on the true owner's mobile device may display an interface with the alert along with a selectable option to allow or disallow the transaction. The true owner may either allow or disallow the transaction by selecting an option.

If the transaction is disallowed, the user may place a soft lock on the card. In this example, a soft lock prevents the card from participating in at least one transaction, and may be indefinitely locked until the true owner decides to allow transactions again. It may not be a permanent lock of the card, as the credit card number is still in use and the card itself is not replaced. This is in contrast to a hard lock, where the user receives a new card and a new card number. An advantage of the soft lock is that it allows the authorized user to disallow certain transactions without causing the inconvenience of having to replace a credit card and card number. This may save a user time, save a card issuer from replacing the card, yet still allows for some transactions to be disallowed for a variety of different reasons that may range from fraud to something short of fraud.

In another example use case, there is one card holder 104 in a household, where the household has multiple people and multiple phones, and each person is associated with one phone. This example use case also assumes that the card holder 104 has already been preprogrammed so that it knows the associations between the different cards and the different phones. Person A intends to go out shopping, so she grabs the card holder 104, attaches it to her phone, and inserts those cards that she believes are hers. However, Person A has accidentally picked up Person B's card, which is associated with a different phone (i.e., Person B's phone). When Person A removes the card from the card holder 104 to attempt to use it at a point-of-sale (POS), the card holder 104 detects this attempted use and sends a message to Person B. As noted above, a POS may be associated with a merchant server, such as merchant server 140.

When Person A removes the card from the card holder 104, the card holder 104 is aware of the removal, and that triggers a process. The card holder 104 then broadcasts to nearby devices to inquire if there is a POS at which someone is attempting to swipe Person B's card (perhaps by identifying a card—"Visa ending in 1234"). The broadcast may use any appropriate wireless protocol, such as NFC or Bluetooth. A POS may then respond to the card holder 104 in the affirmative and may also include a purchase amount in its transmitted reply. In response to the POS reply, the card holder 104 then reaches out to Person B at an application on Person B's phone to alert Person B of the attempted use. Person B's application presents an interface to alert Person B and to give Person B the option to allow or disallow the transaction, which is similar to the prior example use case.

Figure 4:
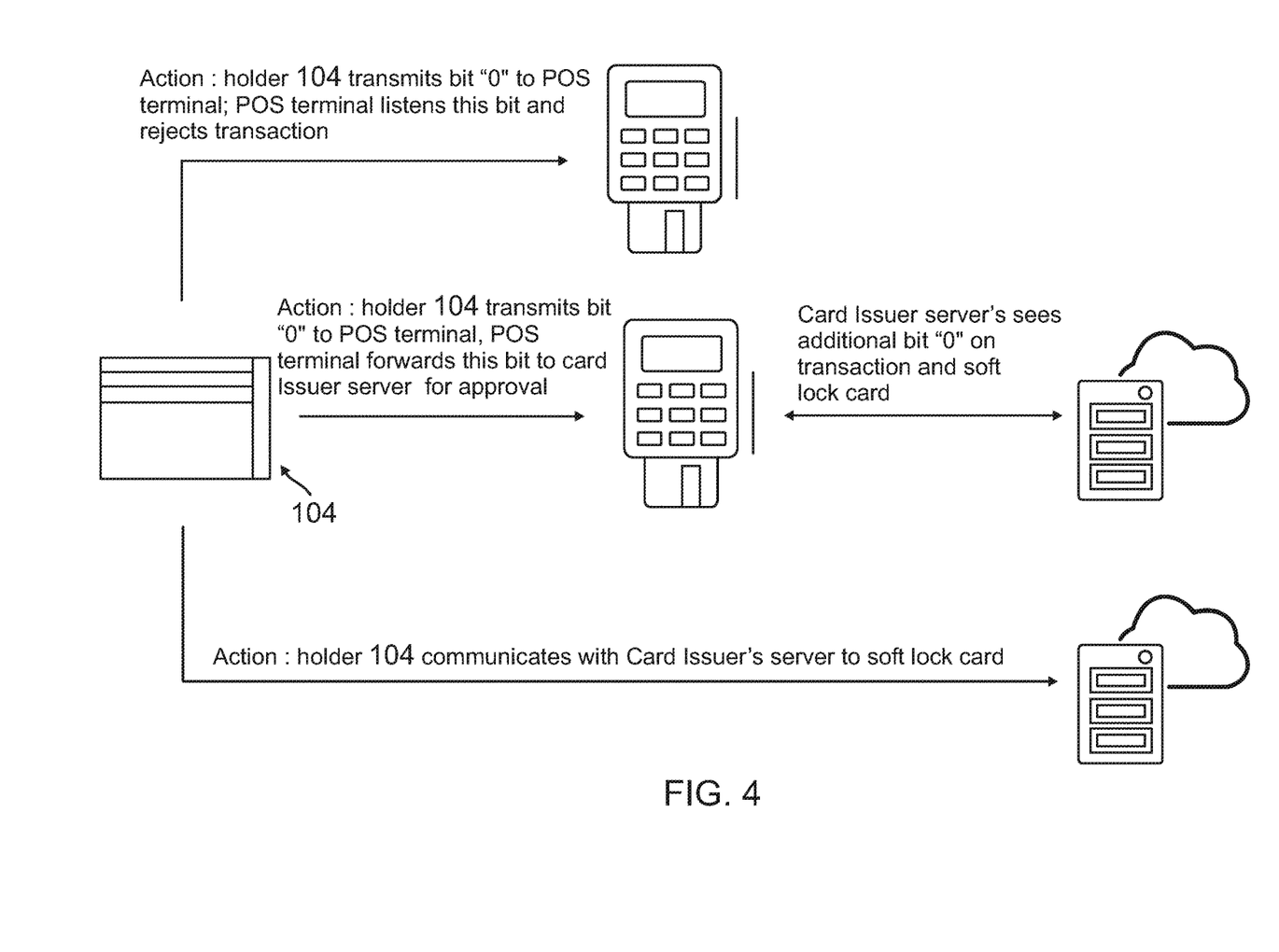
FIG. 4 illustrates processes performed by a card holder to prevent a transaction according to one embodiment.

Continuing with the example in which Person B has been given an option to either allow or not allow the transaction—if Person B decides to allow the transaction, then the card holder 104 responds back to the POS with a message to proceed. However, if Person B decides to disallow the transaction, then a number of actions may happen. FIG. 4 illustrates a plurality of actions that may be taken, according to one embodiment. A given embodiment may perform one or a combination of any of the actions as appropriate for a given situation. For instance, in a first example action, the card holder 104 may communicate with the card issuer's server to implement a soft lock of the card, as described in the previous example use case (above). The card holder 104 may communicate with the card issuer's server using its own wireless communication ability or by using a communication ability of a mobile device to which it is paired. Using FIG. 1 as an example, card holder 104 may communicate with issuer host 168 over network 160 to facilitate the soft lock.

In another example action, the card holder 104 may communicate with the POS to tell the POS that the transaction is not allowed (e.g., by transmitting a "zero" bit). The POS may then decline the transaction itself. In other actions, the POS may transmit a message to other entities to indicate that the transaction should be declined, whether or not the POS itself has declined the transaction. For instance, the POS may transmit a message to the card issuer to allow the card issuer to reject the transaction and to alert the card issuer to the use of the card. The POS may also transmit the same or a different message to the acquiring bank or the payment network to alert the acquiring bank or payment network that the transaction is not allowed. Thus, in some examples, the card holder 104 may use the POS to forward a message to other entities (e.g., issuing bank, acquiring bank, or payment network) to indicate that the transaction should be declined. However, in other examples, the card holder 104 may send the message itself by using its own wireless capabilities or the wireless capabilities of its paired mobile device. The transaction may or may not continue through use of a different funding card.

The above use case includes as an example transmission of a 0 bit between the card holder 104 and the POS. However, the signal sent by the card holder 104 may include any appropriate information that may be understood by another entity. For instance, the card holder 104 may use a simple binary 1 or 0 to indicate that a transaction is allowed or not allowed or may use more complex messages, such as ASCII text including English-language or other language messages. In some embodiments, simpler messages may save bandwidth, whereas more complex messages may provide for more robust communication.

Continuing with a further use case, there may be multiple card holders 104 in a household having multiple people and multiple phones. Each card holder 104 is usually only used by one person, and one person has one phone. In this example use case the card holders 104 in the same household may recognize each other and communicate with each other. Additionally or alternatively, each of the card holders 104 may communicate with a central server (e.g., tracking server 134) over a network so that the central server has entries for the different card holders 104 in its database, whether or not the card holders 104 recognize each other. In the case where the card holders 104 recognize each other, then they may communicate with each other to, e.g., notify one smart card holder that a wrong credit card is in another smart card holder.

Continuing with the example, the card holders 104 may have Bluetooth or NFC themselves and may communicate with each other by Bluetooth or NFC. Also, since there is an application on each of the individual phones that are associated with the card holders 104, a given card holder 104 may go through the application to use its phone's wireless communication capabilities (e.g., Bluetooth, Wi-Fi, 4G) to communicate with other card holders 104 or with the central server. Thus, some embodiments may include introducing the card holders 104 in a same household to each other by pairing using Bluetooth or other technology.

Relationships between different card holders 104 may be managed by the card holders 104 themselves or by the central server. It may be advantageous in some embodiments that there is a central system that tracks the different card holders 104 in its database in order to manage what would otherwise be direct communication between different card holders 104. This may allow the central server to provide security, by keeping information of one card holder 104 from being disclosed to another card holder 104. However, security may be provided by any number of techniques, and in some instances it may be acceptable to have card holders 104 recognize each other and store information about one another in their own memories.

In another example use case, a user leaves a funding card at a merchant. The card is registered by the card holder 104 with the user's phone, but the card is now physically removed and geographically separated from the card holder 104 and phone. The card holder 104 recognizes the absence of the card and has alerted the user by the application on the user's phone and may have also alerted the issuing bank (e.g., the issuer host 168) and the central server (e.g., tracking server 134). If an unauthorized user attempts to use the card at the same or different merchant later, the transaction message from the POS is eventually received by the issuing bank. In response, the issuing bank may then transmit a message to the central server or directly to the phone of the user. So then either the issuing bank itself or the central server may send a message to the user's phone, which would cause the application on the user's phone to provide an alert and an opportunity for the user to decline the transaction. Whether or not the user declines the transaction, the issuing bank may choose to decline the transaction itself. In either event, unauthorized use of the card may be prevented. Furthermore, this use case illustrates that both the central server and the issuing bank may have a role in communication with the user's phone in the case when a particular card is separated from the card holder 104.

The various use cases described above are further illustrated by the flowcharts of FIGS. 5 and 6 (discussed in more detail below). The example use cases described above assume that the true card owner is in possession of his phone. However, additional use case addresses a scenario where the card holder 104 stores a plurality of funding cards and is physically attached to a mobile device, and the card holder 104 and the mobile device are either lost or stolen. In such an instance, technology of the card holder 104 or the card holder itself may be used to detect that the card holder 104 and the mobile device are in possession of an unauthorized user. For example, a camera on the card holder 104 or the mobile device may be used to scan a face or other physical trait of a person holding the card holder 104 and the mobile device. If scanning the face or other physical trait indicates a lack of a match to a known reference of the true owner, then either the card holder 104 or the phone may transmit a message to the issuing bank to disallow any further transactions with that card. Of course, such embodiment is not limited to cameras, as other biometric sensors, such as fingerprint sensors and even other identity mechanisms such as password recognition may be used to detect possession by an unauthorized user. When possession by an unauthorized user is detected, the issuing bank, acquiring bank, or payment network may be alerted to decline any further transactions until the situation is resolved.

Various embodiments may provide one or more advantages over traditional solutions. For instance, a card holder 104 may track when cards are inserted or removed and when cards are physically near a device of a known user. Such system may thus track physical possession of cards by an authorized user of those cards. When a card is attempted to be used by another user, various embodiments may allow true authorized users to police the transactions with their cards for any number of reasons, whether it is fraud or something short of fraud. Providing a user with an option of a soft lock may allow a granularity of policing transactions that is less drastic than replacing numbers and physical cards, thereby creating efficiency and increasing security.

Figure 5:
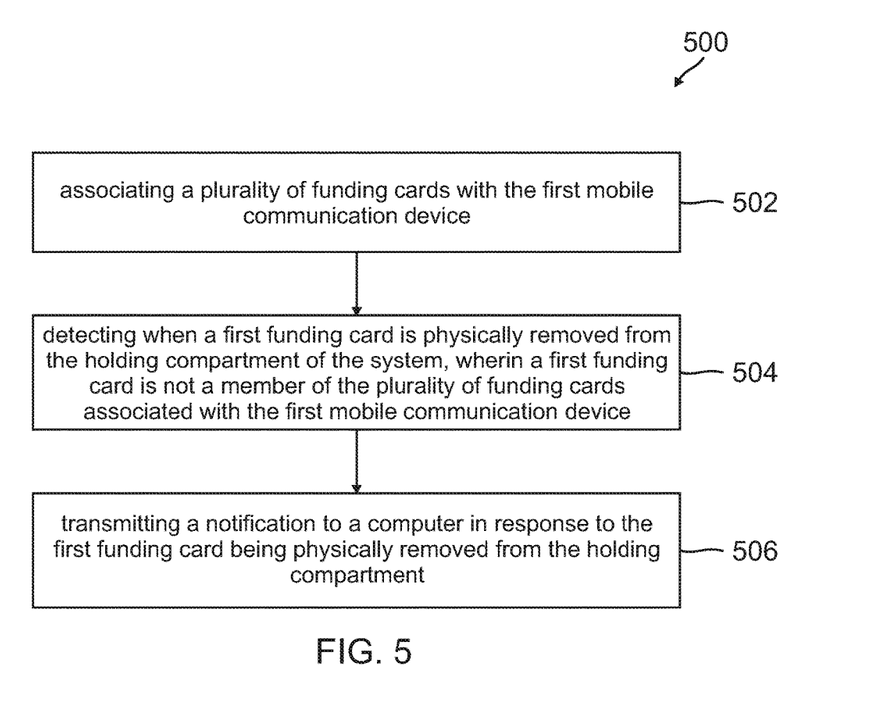
FIGS. 5-7 illustrate processes performed by a card holder to prevent transactions, according to various embodiments.

FIG. 5 is an illustration of an example method 500 of tracking use of a card by a card holder, such as card holder 104, according to one embodiment. Method 500 may be performed by a card holder and, specifically, by a processor of the card holder as it executes computer code to provide functionality described herein.

At action 502, the card holder associates a plurality of funding cards with a first mobile communication device. An example registration process is described above with respect to a use case. For instance, when a user inserts a new card into the card holder, the card holder may present an option on a user interface of an application on the user's phone to allow the user to associate the card with the card holder and phone. If the user chooses to register the card, the card holder itself may save in its memory information about the card (e.g., username, account number, expiration date, issuing bank, and the like) as well as an identification of the mobile device. An identification of the mobile device may include some information sufficient to identify the particular mobile device from other similar mobile devices, such as a user-applied name, a serial number, a phone number, a network address, or the like. The card holder itself may save such information in its memory in a data structure having a plurality of entries to associate each of the different funding cards with the particular mobile device. In fact, the card holder may support other mobile devices as well, and its memory may store associations of other cards with other mobile devices. As noted above, the registration process which associates the funding cards with mobile communication devices may also include transmitting messages to a central server so that the associations are saved at the central server as well.

Furthermore, as noted above, the card holder may read cards as they are physically inserted into the holding compartment and may also detect when cards are removed from the holding compartment. The card holder may then track insertions and removals by storing an indication in its memory when a particular card is physically inserted or physically removed from the holding compartment.

At action 504, the card holder detects when a first funding card is physically removed from the holding compartment of the system. In this example, the first funding card is not a member of the plurality of funding cards that are associated with the particular mobile communication device. As described above, the card holder is aware that the first funding card is not a member of the plurality of funding cards because it read the first funding card when it was previously inserted and compared it to previously-registered cards. Action 504 may occur if a user accidentally (or on purpose) picks up another user's card and inserts it into the card holder.

At action 506, the card holder transmits a notification to a computer in response to detecting physical removal of the unregistered card at action 504. In one example, transmitting the notification includes the card holder (either by itself or by use of wireless communication capabilities of the mobile communication device) transmitting a query to any nearby POS devices regarding the first funding card being used for transaction. For instance, the card holder may broadcast by Bluetooth or NFC a query to ask any nearby POS computer systems whether the particular card is being used at a transaction at that POS. In response to an affirmative reply from a POS device, the card holder may then transmit a message to the POS to decline the transaction. Such actions may also include transmitting a message to a server of an issuing entity to decline the transaction, transmitting a message to a server of a merchant acquirer or a payment network to decline the transaction. Such actions may also include transmitting a message to a mobile communication device associated with an authorized user of the card to request from the authorized user whether to allow or not allow the transaction. For instance, the authorized user may be given an option to place a soft lock on the card or to allow the transaction.

The scope of embodiments is not limited to the particular series of actions illustrated in FIG. 5. Rather, various embodiments may add, omit, rearrange, or modify one or more of the actions. For instance, while method 500 detects that an unregistered card was stored in the holding compartment and then removed from the holding compartment, other embodiments include tracking registered cards. In one example, there is a second funding card that is a member of the plurality of funding cards that is associated with the mobile communication device. The card holder detects that the second funding card is not physically stored in the holding compartment of the system by, e.g., comparing a set of inserted cards to the set of registered cards and noting differences. In response to detecting that the second funding card is not physically stored in the holding compartment, the card holder transmits a notification to the first mobile communication device. The notification may provide an indication of the status of the second funding card and may be visually displayed upon a user interface of the first mobile communication device by the application. The card holder may also cause an issuing entity of the second funding card to place a soft lock on the second funding card in response to detecting that the second funding card is not physically stored in the holding compartment.

Figure 6:
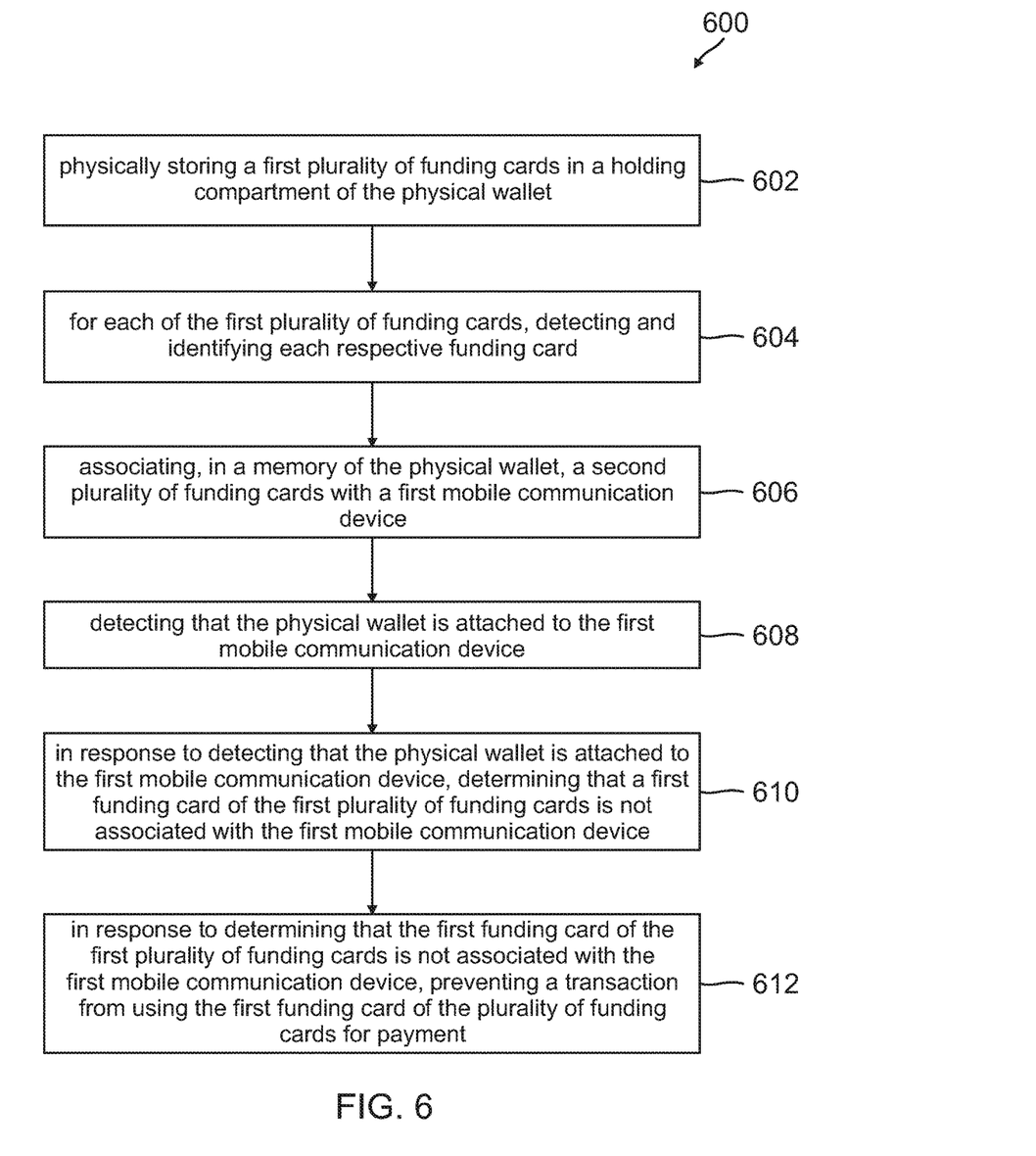

FIG. 6 is an illustration of example method 600 for preventing a transaction, according to one embodiment. Similar to method 500, method 600 may be performed by a card holder and, specifically, by a processor of the card holder as it executes computer code to provide functionality described herein.

At action 602, the card holder physically stores a first plurality of funding cards in a holding compartment of the physical wallet. An example is illustrated at FIGS. 3A and 3B. At action 604, the card holder detects and identifies each respective funding card of the first plurality of funding cards. An example as discussed above, where the card holder reads each of the cards as it is inserted and tracks in memory which of the cards are inserted and which of the cards have been removed. Thus, the processor of the card holder stores data regarding registered cards and inserted cards so that various information may be derived therefrom, including cards that are registered but not currently inserted, cards that have been previously inserted, cards that have been removed, unregistered cards that are currently inserted, unregistered cards that were inserted but have been removed, and the like.

An action 606, the card holder associates in its memory a second plurality of funding cards with a first mobile device. Put another way, the first plurality of funding cards (i.e., those stored in the holding compartment) and the second plurality of funding cards (i.e., those registered with the first mobile communication device in the memory of the card holder) are different sets, though they may have significant overlap and may even be identical in some examples. However, it is possible that some registered cards may not be inserted or that some unregistered cards may be inserted at any point in time.

An action 608, the card holder detects that it is attached to the first mobile communication device. Action 608 may be performed by establishing a short range wireless communication (e.g., NFC) between the card holder and to the first mobile communication device. Of course, the scope of embodiments is not limited to any particular technique to detect that the card holder is attached to the first mobile communication device, as any appropriate technique may be used.

Action 608 may also include the card holder saving in its memory that it is presently attached to the first mobile communication device. In fact, various embodiments may include the card holder storing in its memory an indication that it either is or is not attached to any particular mobile communication device that it may recognize. Thus, at a given time, the card holder may perform an action in response to either being physically attached to a known mobile communication device or not being physically attached to a known mobile communication device.

At action 610, the card holder determines that a first funding card of the first plurality of funding cards is not associated with the first mobile communication device. As noted above with respect to action 604, the card holder stores in memory indications of the cards that are registered to the first mobile communication device and also cards that are physically inserted. The processor of the card holder may access its memory and perform logic to derive that one of the inserted cards is not associated with the first mobile communication device.

At action 612, the card holder prevents a transaction from using the first funding card of the first plurality of funding cards for payment. Action 612 may be performed in response to recognizing that the first funding card is not associated with the particular mobile device, which may be an indication that the person in possession of the first funding card is not the authorized user. Preventing the transaction may include the card holder sending a message to a POS to decline the transaction or sending a message to any other entity, such as an issuing bank, an acquiring bank, or a payment network. Examples are provided above with respect to action 506 of FIG. 5.

The scope of embodiments is not limited to the particular series of actions depicted in FIG. 6. Rather, various embodiments may add, omit, rearrange, or modify the actions. For instance, various embodiments may perform any appropriate action response to determining that an unregistered card is inserted in the holding compartment or that a registered card is not inserted in the holding compartment.

Figure 7:
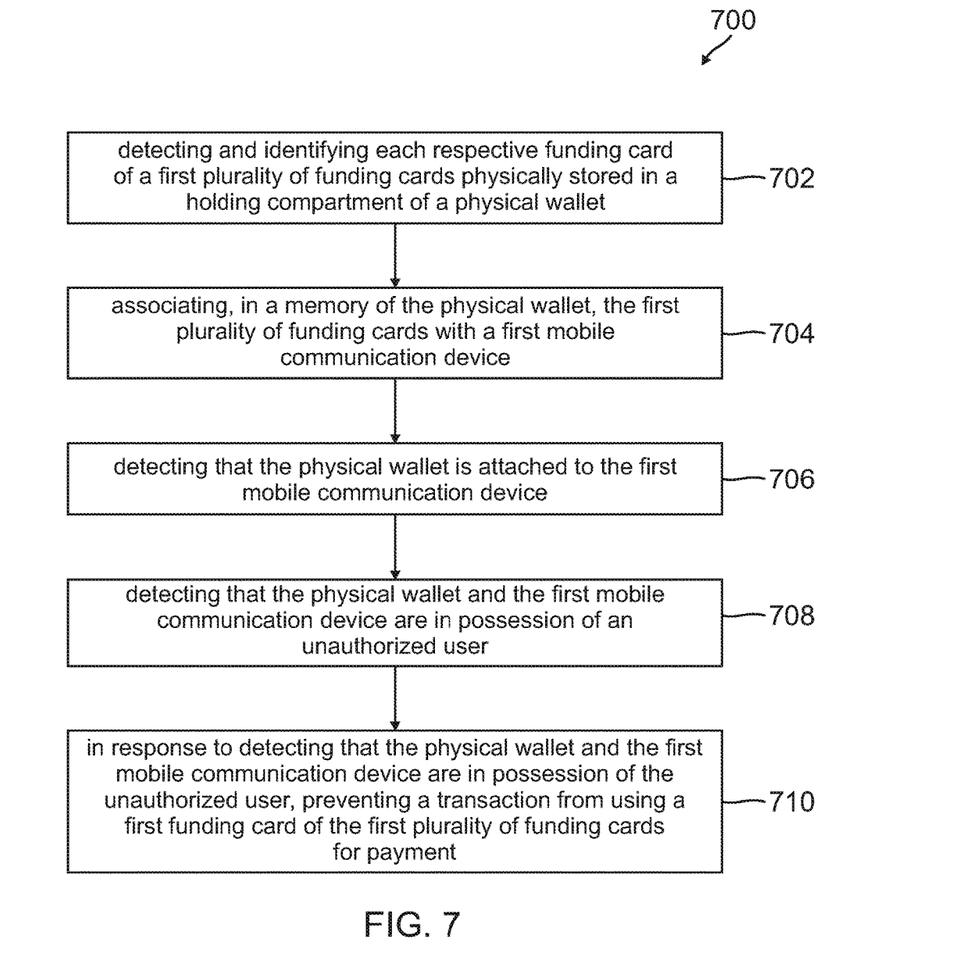

FIG. 7 is an illustration of an example method 700 of tracking use of a card by a card holder, such as card holder 104, according to one embodiment. Method 700 may be performed by a card holder and, specifically, by a processor of the card holder as it executes computer code to provide functionality described herein. Method 700 is directed to a use case in which the card holder and the mobile communication device are in possession of an unauthorized user.

Actions at 702-706 are the same as or similar to actions 602-606 of FIG. 6.

Looking at action 708, the card holder detects that itself and the first mobile communication device are in possession of an unauthorized user. In various embodiments, the card holder and the first mobile communication device may both include devices that allow for identification of the user. Examples of such devices may include cameras for facial recognition, fingerprint detection, iris detection, password entry, voice recognition, and the like. Any user identification techniques may be used and may be incorporated into either or both of the card holder and the first mobile communication device. Thus, the unauthorized user may be seen by a camera and may fail user identification, may touch a fingerprint scanner and fail user identification, may incorrectly type in a password and fail user identification, etc.

At action 710, the card holder prevents a transaction from using the first funding card of the first plurality of funding cards for payment. Of note is that the first funding card may or may not be associated with the first mobile communication device. In other words, various embodiments may prevent using any of the cards stored in the holding compartment for transaction, whether or not a particular funding card is previously registered. Action 710 may include sending a message to a central server and/or an issuing bank to alert them of possession by an unauthorized user. The issuing bank may then place a soft lock or a hard lock on the card as appropriate.

The scope of embodiments is not limited to the particular series of actions of method 700. Rather, the scope of embodiments may include adding, omitting, rearranging, or modifying various actions. For instance, method 700 may also include a transmitting an alert to an authorized user of the first funding card and soliciting from the authorized user to allow or disallow the transaction.

Figure 8:
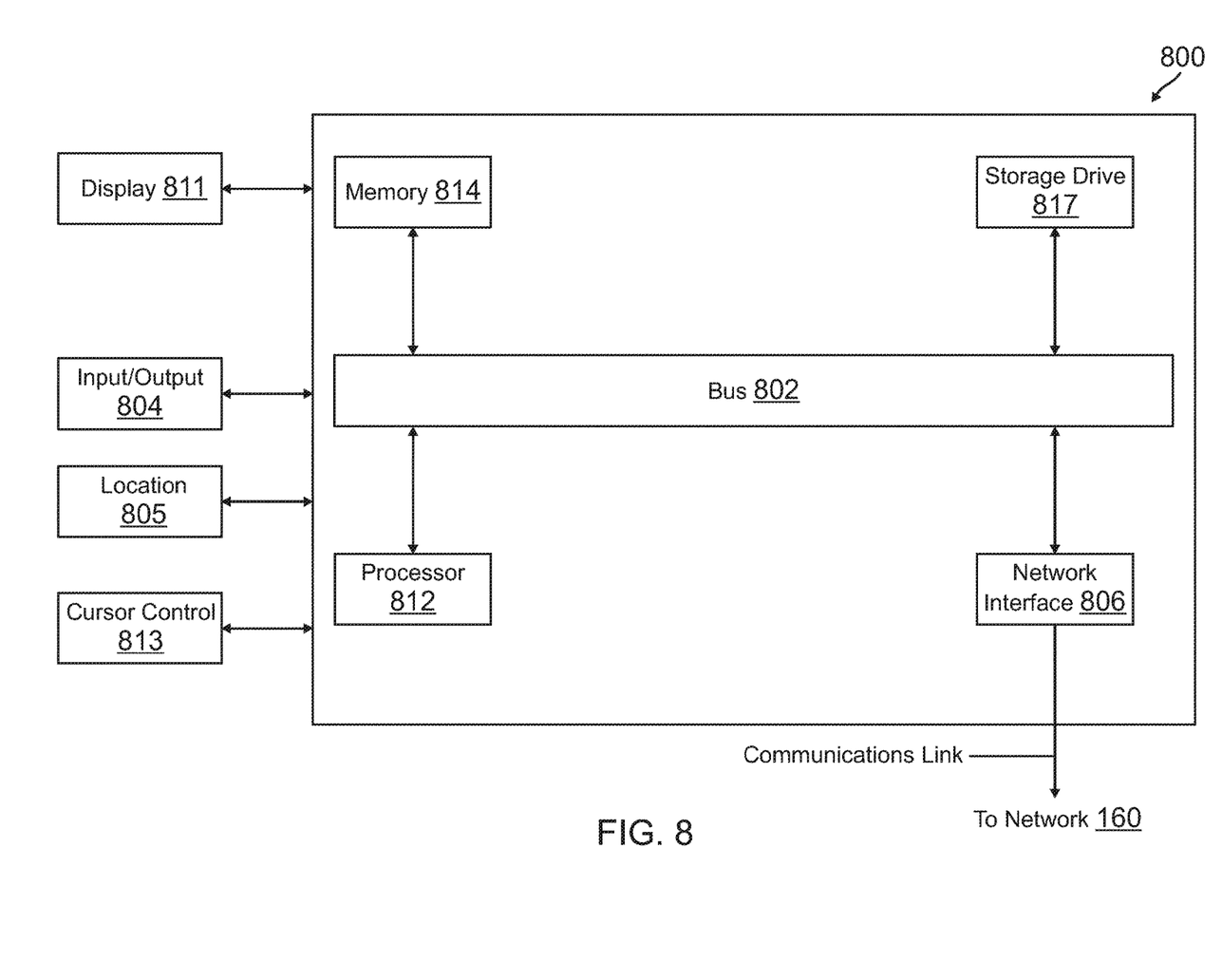
FIG. 8 is a block diagram of a computer system suitable for implementing one or more components in FIG. 1 according to one embodiment.

FIG. 8, an embodiment of a computer system 800 suitable for implementing, for example, the computing devices 104, 110, 134, 140, 165, and 168 of FIG. 1 discussed above. It should be appreciated that other devices utilized in the system discussed above may be implemented as the computer system 800 in a manner as follows.

In accordance with various embodiments of the present disclosure, computer system 800, such as a smart phone, computer, and/or a network server, includes a bus 802 or other communication mechanism for communicating information, which interconnects subsystems and components, such as a processing component 812 (e.g., processor, microcontroller, digital signal processor (DSP), etc.), a system memory component 814 (e.g., RAM) a storage drive component 817 (e.g., solid-state, hard drive, or optical), a network interface component 806 (e.g., wireless card, modem, or Ethernet card), a display component 811 (e.g., a touchscreen, CRT, or LCD), an input/output component 804 (e.g., keyboard, keypad, a touchscreen), a cursor control component 813 (e.g., mouse, pointer, or trackball), and/or a location determination component 805 (e.g., a Global Positioning System (GPS) device as illustrated, a cell tower triangulation device, and/or a variety of other location determination devices known in the art). In one implementation, the storage drive component 817 may comprise a database having one or more storage drive components.

In accordance with embodiments of the present disclosure, the computer system 800 performs specific operations by the processor 812 executing one or more sequences of instructions contained in the memory component 814, such as described herein with respect to FIGS. 1-7 discussed above. Such instructions may be read into the system memory component 814 from another computer readable medium, such as storage drive 817. In other embodiments, hard-wired circuitry may be used in place of or in combination with software instructions to implement the present disclosure.

Logic may be encoded in a computer readable medium, which may refer to any tangible and non-transitory medium that participates in providing instructions to the processor 812 for execution. Such a medium may take many forms, including but not limited to, non-volatile media and volatile media. In various implementations, non-volatile media includes hard drive or solid state drives, such as the storage drive component 817, and volatile media includes dynamic memory, such as the system memory component 814. Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of the computer systems 800 coupled by a communication link 818 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 818 and the network interface component 806. The network interface component 806 may include an antenna, either separate or integrated, to enable transmission and reception via the communication link 818. Received program code may be executed by processor 812 as received and/or stored in storage drive component 817 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, while most of the description has been focused on the card holder being the device that communicates or transmits to other devices, such as those associated with a POS, a service provider, a card issuer, a merchant, or another user, once the card holder reads or otherwise detects a removal or insertion of a card, the phone or other mobile device associated with the card holder may alternatively make those communications or transmissions. This may be advantageous to simplify and reduce the cost of the card holder by having the mobile device handle the longer range communications, as the mobile device already has those capabilities. As such, the card holder may simply communicate data from reading the card to the mobile device, e.g., using NFC, and then have the mobile device handle some or all of the subsequent communications described above. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a physical wallet configured to attach to a first mobile communication device and to physically store a first funding card and additional funding cards in a holding compartment;
   a non-transitory memory; and
   one or more hardware processors coupled to the non-transitory memory and configured to read instructions from the non-transitory memory to cause the system to perform operations comprising:
   associating a plurality of funding cards with the first mobile communication device, wherein the first funding card is not a member of the plurality of funding cards associated with the first mobile communication device;
   detecting when the first funding card is physically removed from the holding compartment of the system;
   querying a point-of-sale (POS) computer system regarding the first funding card being used for a transaction; and
   transmitting a notification to a computer in response to the first funding card being physically removed from the holding compartment, the notification comprising a message to decline the transaction in response to a reply from the POS computer system indicating that the first funding card is being used for the transaction.

2. The system of claim 1, further comprising a card reader integrated with the holding compartment, wherein the operations further comprise:
   reading the first funding card as it is physically inserted into the holding compartment; and
   storing an indication that the first funding card is physically inserted into the holding compartment.

3. The system of claim 2, wherein the card reader comprises a camera.

4. The system of claim 1, wherein the operations further comprise:
   detecting that a second funding card, which is a member of the plurality of funding cards, is not physically stored in the holding compartment of the physical wallet;
   transmitting a notification to the first mobile communication device regarding a status of the second funding card in response to detecting that the second funding card is not physically stored in the holding compartment; and
   causing an issuing entity of the second funding card to lock the second funding card in response to detecting that the second funding card is not physically stored in the holding compartment.

5. A system, comprising:
   a physical wallet configured to attach to a first mobile communication device and to physically store a first funding card and additional funding cards in a holding compartment;
   a non-transitory memory; and
   one or more hardware processors coupled to the non-transitory memory and configured to read instructions from the non-transitory memory to cause the system to perform operations comprising:
   associating a plurality of funding cards with the first mobile communication device, wherein the first funding card is not a member of the plurality of funding cards associated with the first mobile communication device;
   detecting when the first funding card is physically removed from the holding compartment of the system; and
   transmitting a notification to a computer in response to the first funding card being physically removed from the holding compartment, wherein transmitting the notification to the computer comprises querying a point-of-sale (POS) computer system regarding the first funding card being used for a transaction, wherein transmitting the notification to the computer comprises:
   in response to a reply from the POS computer system indicating that the first funding card is being used for the transaction, transmitting a message to a server of an entity to decline the transaction.

6. The system of claim 5, wherein
   the entity is an issuing entity of the first funding card.

7. The system of claim 6, further comprising a card reader integrated with the holding compartment, wherein the operations further comprise:
   reading the first funding card as it is physically inserted into the holding compartment; and
   storing an indication that the first funding card is physically inserted into the holding compartment.

8. The system of claim 5, further comprising a card reader integrated with the holding compartment, wherein the operations further comprise:
   reading the first funding card as it is physically inserted into the holding compartment; and
   storing an indication that the first funding card is physically inserted into the holding compartment.

9. The system of claim 5, wherein the entity is a merchant acquirer.

10. A system, comprising:
a physical wallet configured to attach to a first mobile communication device and to physically store a first funding card and additional funding cards in a holding compartment;
a non-transitory memory; and
one or more hardware processors coupled to the non-transitory memory and configured to read instructions from the non-transitory memory to cause the system to perform operations comprising:
associating a plurality of funding cards with the first mobile communication device, wherein the first funding card is not a member of the plurality of funding cards associated with the first mobile communication device;
detecting when the first funding card is physically removed from the holding compartment of the system;
querying a point-of-sale (POS) computer system regarding the first funding card being used for a transaction;
receiving a reply from the POS computer system indicating that the first funding card is being used for the transaction; and
in response to a reply from the POS computer system indicating that the first funding card is being used for the transaction, transmitting a message to a second mobile communication device to request from a user of the second mobile communication device whether to allow or not allow the transaction.

11. The system of claim 10, further comprising a card reader integrated with the holding compartment, wherein the operations further comprise:
reading the first funding card as it is physically inserted into the holding compartment; and
storing an indication that the first funding card is physically inserted into the holding compartment.

12. A system, comprising:
a physical wallet configured to attach to a first mobile communication device and to physically store a first funding card and additional funding cards in a holding compartment;
a non-transitory memory; and
one or more hardware processors coupled to the non-transitory memory and configured to read instructions from the non-transitory memory to cause the system to perform operations comprising:
associating a plurality of funding cards with the first mobile communication device, wherein the first funding card is not a member of the plurality of funding cards associated with the first mobile communication device;
detecting when the first funding card is physically removed from the holding compartment of the system;
transmitting a notification to a computer in response to the first funding card being physically removed from the holding compartment;
associating a second funding card with the first mobile communication device, including:
detecting insertion of the second funding card into the holding compartment;
determining that the second funding card is not currently associated with the first mobile communication device;
transmitting a first message to an application at the first mobile communication device requesting to associate the second funding card with the first mobile communication device; and
storing an association between the second funding card and the first mobile communication device in response to receiving a reply from the application; and
transmitting a second message to a network server associated with an issuer of the second funding card, the second message indicating that the second funding card has been associated with the first mobile communication device and the system.

13. A method performed by a physical wallet configured to attach to a plurality of mobile communication devices, the method comprising:
detecting and identifying a first funding card held in a holding compartment of the physical wallet;
detecting that the physical wallet is attached to a first mobile communication device;
in response to detecting that the physical wallet is attached to the first mobile communication device, determining that the first funding card is not associated with the first mobile device; and
in response to determining that the first funding card is not associated with the first mobile communication device, preventing a transaction from using the first funding card.

14. The method of claim 13, wherein detecting that the physical wallet is attached to the first mobile communication device comprises:
establishing a communication session between a processing device of the physical wallet and a processing device of the first mobile communication device.

15. The method of claim 13, further comprising:
determining that the first funding card is associated with a second mobile communication device;
determining that the second mobile communication device is not within a preprogrammed range of the physical wallet; and
transmitting a notification to the second mobile communication device regarding a status of the first funding card.

16. A non-transitory machine-readable medium having stored thereon machine-readable instructions executable to cause a machine to perform operations comprising:
detecting and identifying each respective funding card of a first plurality of funding cards physically stored in a holding compartment of a physical wallet;
associating, in a memory of the physical wallet, the first plurality of funding cards with a first mobile communication device;
detecting that the physical wallet is attached to the first mobile communication device;
detecting that the physical wallet and the first mobile communication device are in possession of an unauthorized user; and
in response to detecting that the physical wallet and the first mobile communication device are in possession of the unauthorized user, preventing a transaction from using a first funding card of the first plurality of funding cards for payment.

17. The non-transitory machine-readable medium of claim 16, wherein detecting that the physical wallet and the first mobile communication device are in possession of the unauthorized user comprises:
capturing a photo of the unauthorized user by a camera of the first mobile communication device; and
comparing the photo of the unauthorized user to reference data.

18. The non-transitory machine-readable medium of claim 16, wherein detecting that the physical wallet and the first mobile communication device are in possession of the unauthorized user comprises:
- capturing a fingerprint of the unauthorized user by a fingerprint scanner of the first mobile communication device; and
- comparing the fingerprint of the unauthorized user to reference data.

19. The non-transitory machine-readable medium of claim 16, wherein detecting that the physical wallet and the first mobile communication device are in possession of the unauthorized user comprises:
- receiving a plurality of incorrect password attempts by the first mobile communication device; and
- determining that the plurality of incorrect password attempts exceeds a threshold.

20. The non-transitory machine-readable medium of claim 16, wherein the operations further comprise:
- causing an issuing entity of the first funding card to lock the first funding card in response to detecting that the physical wallet and the first mobile communication device are in possession of the unauthorized user.

21. The non-transitory machine-readable medium of claim 16, wherein the operations further comprise:
- transmitting a message to a network server associated with an issuing entity of the first funding card, the message indicating that the first funding card is in possession of the unauthorized user.

* * * * *